United States Patent [19]

Olsen et al.

[11] 4,169,877

[45] Oct. 2, 1979

[54] CENTERING A TIRE IN A MOLD

[75] Inventors: Richard J. Olsen, Massillon; Max D. Brinkley, North Canton, both of Ohio; John R. Thiele, Topeka, Kans.

[73] Assignee: The Goodyear Tire & Rubber Company, Akron, Ohio

[21] Appl. No.: 960,277

[22] Filed: Nov. 13, 1978

Related U.S. Application Data

[60] Division of Ser. No. 845,512, Oct. 26, 1977, Pat. No. 4,147,482, which is a continuation-in-part of Ser. No. 738,493, Nov. 4, 1976, abandoned.

[51] Int. Cl.$^2$ .............................................. B29H 5/02
[52] U.S. Cl. .................................................... 264/315
[58] Field of Search ................... 425/46, 47, 20, 28 R; 264/315

[56] References Cited

U.S. PATENT DOCUMENTS

| | | | |
|---|---|---|---|
| 906,256 | 12/1908 | Mell | 425/46 X |
| 2,174,189 | 9/1939 | Heintz | 425/20 |
| 2,184,119 | 12/1939 | Glynn | 425/20 |
| 2,327,639 | 8/1943 | Heintz | 425/22 |
| 3,730,658 | 5/1973 | Mana | 425/46 X |
| 3,741,696 | 6/1973 | Greenwood | 425/46 X |
| 3,824,048 | 7/1974 | Getz | 425/28 R |

*Primary Examiner*—J. Howard Flint, Jr.
*Attorney, Agent, or Firm*—R. S. Washburn

[57] ABSTRACT

The production of a very large tire by expanding the uncured unrestrained carcass of the tire to engage its crown region with the radially inward surface of a rigid circumferentially continuous centering ring. The ring and the uncured carcass together are transported from the carcass expanding location to the tire curing mold which is adapted to receive and locate the ring and carcass together so as to prevent the mid-circumferential region of the carcass from shifting out of symmetry with the mold. The ring forms a part of the mold for molding and curing the tire carcass. The inward surface of the ring is provided with a pattern of grooves and ridges; the method and apparatus disclosed are particularly useful in the manufacture of a cured tire carcass adapted to combine with an endless tread assembly cured apart from and independently of the tire carcass to make the complete tire. The foregoing abstract is not to be taken as limiting the invention of this application, and in order to understand the full nature and extent of the technical disclosure of this application, reference must be made to the accompanying drawing and the following detailed description.

3 Claims, 5 Drawing Figures

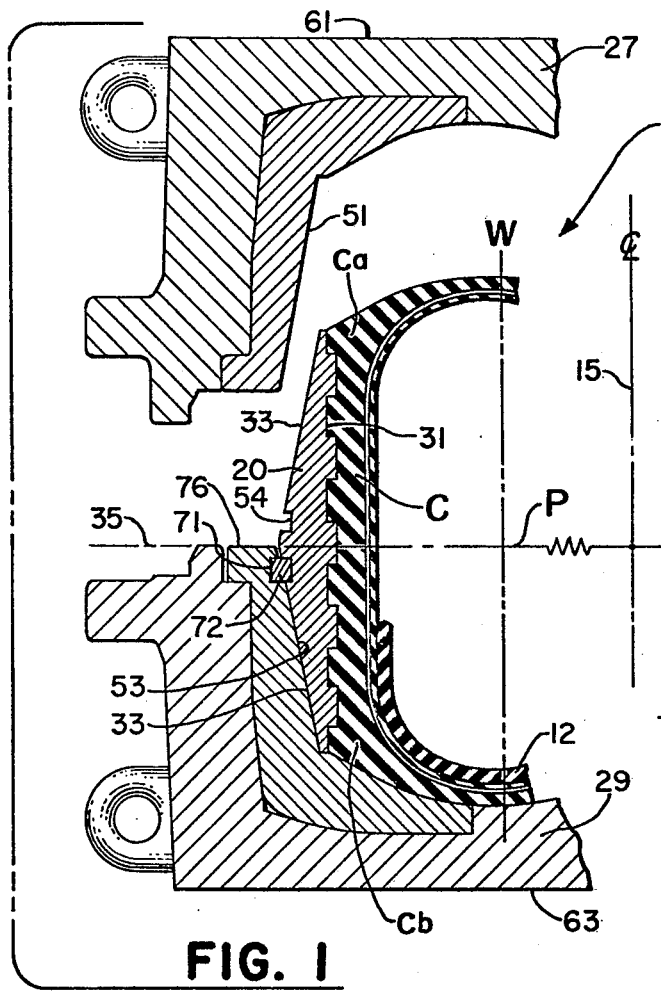
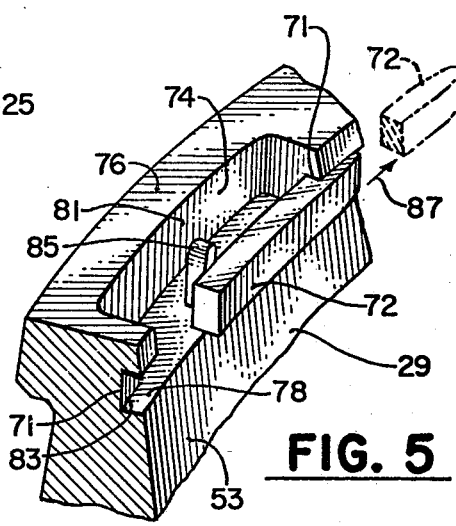
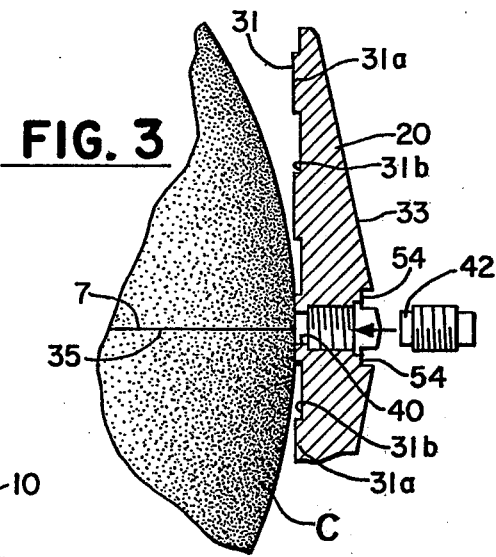
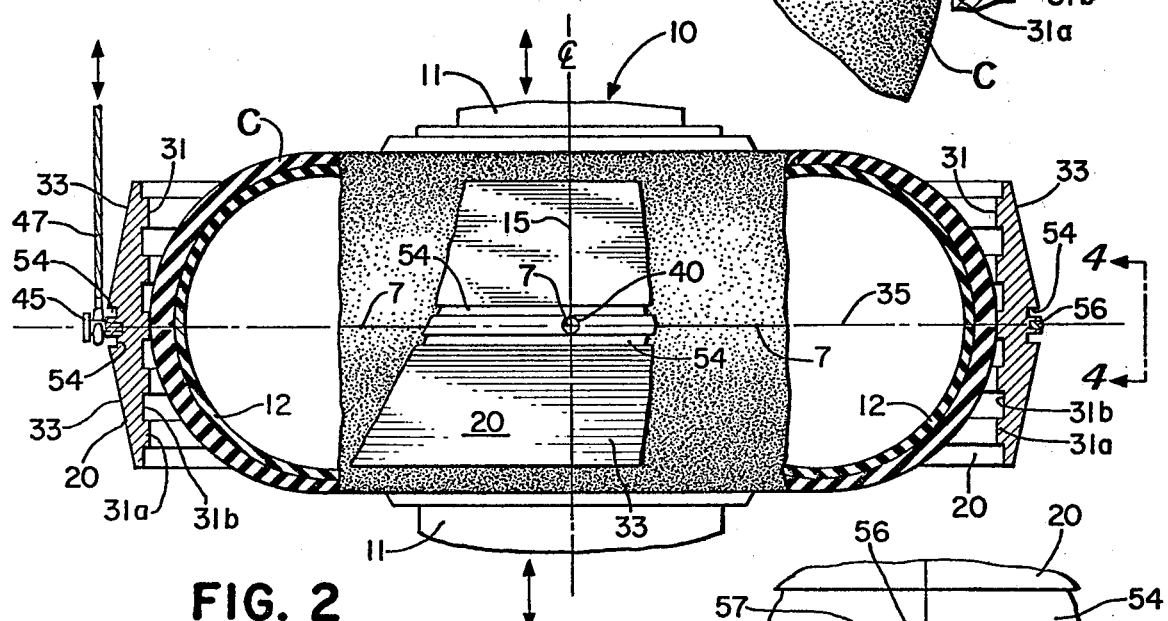
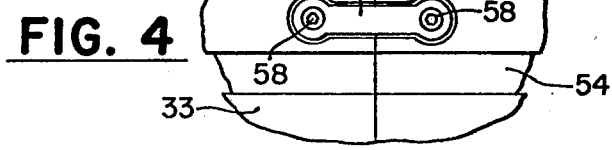

CENTERING A TIRE IN A MOLD

This is a division, of application Ser. No. 845,512 filed Oct. 26, 1977 now U.S. Pat. No. 4,147,482, which in turn is a continuation-in-part of a prior copending application Ser. No. 738,493, filed Nov. 4, 1976 now abandoned.

The invention relates to the manufacture of tires and particularly to manufacture of very large tires as for earthmoving and other off-the-road vehicles. Still more particularly, the invention relates to a method and apparatus for the manufacture of a tire in which a tread assembly, which may include an inextensible belt, and a radial ply carcass built and cured without a tread, are subsequently assembled to form a complete tire.

It has been found extremely difficult to position a large tire carcass properly in the mold in which it is to be cured because a large radial ply carcass is limp and flaccid when uncured and tends to sag below its true mid-circumferential plane.

If the carcass is expanded as by gas pressure within an airbag or bladder, sufficient pressure to resist the sagging expands the carcass diametrally too much to permit the mold to be satisfactorily closed.

It is a principal object of the invention to overcome the difficulties mentioned and thus to facilitate the production of a tire. Broadly, the foregoing and other objects and advantages are accomplished by the provision of an apparatus system for making a big tire comprising means for shaping a carcass for said tire to toroidal shape, curing mold means having two separable mold members disposed oppositely and symmetrically with respect to a mid-circumferential plane of said tire, and a third member disposable between and coaxially of said two mold members, lifting means for transporting said third member from said shaping means to said curing mold means with said carcass held centrally in said third member, said third member comprising removable rigid ring means in endless circular form having a radially inward surface engageable with at least the mid-circumferential centerline region of said carcass to mold and to cure said region and a radially outward surface engageable in coaxial and axially symmetrical register with said plane, said lifting means being operable to dispose said third member around said shaping means, said third member when disposed therearound being cooperable with said shaping means to engage said mid-circumferential centerline region of said carcass being shaped on said shaping means to restrain the diametral expansion of said carcass as shaped on the shaping means to a diameter less than the diameter of the carcass if expanded by said shaping means without said ring.

Broadly, the foregoing and other objects and advantages are accomplished also by the method of making a big tire including preparing for said tire a carcass having a tread-receiving region symmetrical with respect to a mid-circumferential centerline of said carcass, shaping the uncured tire carcass to toroidal form and molding and curing said carcass in a curing mold means having two mold members and a third mold member removably disposable coaxially and symmetrically between said first two members; positioning said third member remotely from said curing mold means and coaxially of said carcass shaping means and symmetrically with respect to the mid-circumferential centerline of said carcass, shaping said carcass to engage said third member by a pressure within said carcass sufficient to maintain said third member and said carcass securely engaged to one another, transporting said third member and the carcass therein together to said molding and curing means, placing said third member with said carcass therein in coaxial registry with one of said two mold members and thereby locating the mid-circumferential centerline of said carcass in the mid-circumferential plane of said curing mold means, placing the other of said two mold members in mold closing relation with said one mold member, and thereafter completing the molding and curing of said carcass.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

FIG. 1 is a schematic view in representative axial cross-section of molding and curing means embodying the centering means of the invention;

FIG. 2 is a schematic view in elevation of a carcass shaping means illustrating its cooperation with the centering means of the invention;

FIGS. 3, 4 and 5 are detail views showing portions of the centering means of FIGS. 1 and 2.

In the particular and preferred embodiments of the invention described herein, reference is made to a tire carcass. The term "carcass" will be understood to mean the part of a tire in which a systematic array of cords or wires embedded in rubbery curable elastomer defines an annular cavity subject to inflation pressure which supports the load on the tire in use. The carcass cross-section, in any axial plane, has a radial dimension of from 50 to 65 percent of the maximum axial width from sidewall to sidewall. The carcass includes a radially outer layer extending circumferentially of the carcass and across the crown region from shoulder to shoulder of the carcass. This layer, of a suitable rubbery compound, after molding and curing of the carcass, then accommodates a tread or equivalent fixed therearound to complete the tire for use. Preferably, the carcass and the tread, assembled and cured independently of and apart from each other, are provided with conjugate interfitting patterns, such that the tread and carcass form a complete tire.

It will be recognized by persons skilled in the arts of manufacturing big tires, e.g., for earthmoving or other off-the-road vehicles, that the method and the apparatus or system herein described can be applied in the manufacture of a unitary tire, i.e., a carcass and tread built and mold-cured as a single unit.

The apparatus system for and the method of making a big tire described herein concern that part of the tire or tire carcass radially outward of the maximum section width W of the axial cross-section. The parts of the carcass or tire and of the mold-curing means inward of maximum section width are not different from known practice and, not being within the scope of the present invention, are not shown or described herein.

The tire carcass according to the foregoing description can have either of two forms: the known open-bellied toroidal form in which the cords or wires are turned about bead rings at the radially inner circumference of the respective sidewalls; or, the known closed torus tire carcass form wherein the cords or wires of the carcass completely enclose the toroidal inflation cavity. It will be appreciated that, since the present method and apparatus system has to do only with the carcass region radially outward of the radius of maximum section width, which of the two forms of carcass is being made is not material to the practice of the method or to use of the apparatus system.

Referring to the drawings, and in particular to FIGS. 1 and 2; the carcass C (of either of the forms as described above) is built in known manner. The mid-circumferential line 7 is suitably marked on the carcass while yet on the carcass building drum. The carcass is then shaped to a toroidal condition by shaping means 10 comprising at least means for introducing air or other gas pressure into the inflation cavity to expand the crown portion radially. The shaping means can also include, in the open-bellied form of tire carcass, bead-engaging rims 11 for moving the bead rings toward each other while introducing inflating pressure to the cavity. Additionally, the shaping means can include a bladder 12 fixed to and extending between the bead-engaging rims, which bladder is expandable into and with the cavity of the carcass C. Shaping means of such type are known and do not require further description here. The shaping step can be effected with the axis 15 of the carcass vertical or horizontal.

In accordance with the present method and system, centering means is provided by a rigid circumferentially continuous metal ring 20 disposed about the carcass during the shaping thereof. The ring is constructed to form the third member of a curing mold assembly 25 having also an upper half member 27 and a lower half member 29.

The centering ring has a generally cylindrical radially inward surface 31 for engagement with the carcass at least in the circumferential region immediately adjacent the mid-circumferential line 7 and preferably across the width of the crown between the shoulders Ca,Cb. This width is the tread receiving portion of the carcass. The surface 31 can be smooth. Preferably, it is provided with a pattern of circumferential ridges 31a and grooves 31b which replicates the pattern of grooves and ridges of the tread later to be applied on the carcass. Alternatively, the inner surface can be provided with a pattern replicating the traction grooves and ridges of a tread for a unitary tire as described above. The surface can also be provided with radially inward extensions adapted to form the lateral edges of the tread at the shoulders of the tire, and to support the tread mass against creep or sag.

The axial width of the inner surface 31 of the ring 20 in the present embodiment extends from shoulder Ca to shoulder Cb across substantially the full width of the crown or tread-receiving portion of the carcass. It is contemplated that the ring 20 can be less in axial extent than the full width of the tread-receiving portion. In any case, the inner surface is of a diameter and of axial length sufficient to restrain the expansion of the carcass to a diameter less than the diameter of the carcass when the same is expanded without the ring 20 and such that when the carcass is placed in the curing mold assembly 25 together with the ring, the engagement of the ring and the carcass is sufficient to prevent the crown region of the carcass from sagging downwardly below the mid-circumferential plane P of the mold.

The radially outward surface 33 of the ring is formed as a pair of cones having a common base coincident with the plane 35 of symmetry of the ring normal to its axis 15. The cones each converge toward the axis at about 11 degrees. Alternatively, each cone has its base parallel to and spaced a small distance from the plane 35, the outward surface 33 between said bases being cylindrical.

To facilitate the placement of the ring 20 about the carcass C so that the plane 35 of symmetry of the ring coincides with the mid-circumferential line 7 of the carcass, a plurality, e.g., three peepholes 40 (FIG. 3) are provided in said plane arcuately spaced around the ring and open for visually aligning the center plane 35 of the ring 20 with the mid-circumferential line 7 of the carcass. A screw plug 42 is provided to reclose each peephole when not being used.

Lift means for lifting, transporting, and for rotating the ring from horizontal to vertical include a pair of trunnions 45 fixed at the plane 35 and spaced 180 degrees apart to provide a turning axis in said plane. (The trunnions are also spaced apart from the peepholes). The trunnions accommodate, respectively, the legs 47 of a wire cable sling suspended from an overhead hoist (not shown).

The radially outward surface 33 of the centering ring 20 is engageable in coaxial and axially symmetrical register with the two mold members 27 and 29 which with the centering ring means provide the curing mold means. The ring 20 is located releasably in the mold assembly 25. Each of the two mold members has a radially inward surface 51,53 formed as a cone and respectively conjugate to the cones of the ring 20 so that when the mold 25 is closed the respective conical surfaces not only locate the ring coaxially of the mold assembly in axially symmetric relation with the plane P but also provide heat transfer contact between the respective mold halves and the ring.

In order to prevent premature removal of the ring 20 from the mold assembly 25, locking means for securing said ring and one of said two mold members is provided. The locking means comprises a circumferentially extending groove 54, sunk in the radially outward surface 33 of the ring. Two such grooves 54 are provided, spaced equally and oppositely with respect to the plane 35. The ring 20 is symmetrical with respect to the plane 35 and can be engaged with the carcass C or in the mold assembly 25 independently of its own "top" or "bottom" orientation.

The ring 20 can when desired be provided in arcuate segments. Alternatively, it is also contemplated that the ring can be divided in two circumferential members joined at the plane 35. The alternative of division of the ring into arcuate segments can be of advantage when the pattern of the radially inward surface 31 of the ring is formed with grooves and ridges of such dimension as to prevent or impede separation of the ring from the carcass or from a unitary tire. For the purposes of the present invention, however, means for connecting the segments or parts of the ring to form a rigid single continuous ring can be provided in the form of the connecting links 56 seated in the recesses 57 and secured to the respective segments by the bolts 58.

The previously referred to curing mold means comprises an assembly 25 of two separable mold members: the upper half mold 27 and the lower half mold 29, which mold halves are constructed to meet concentrically of each other at a parting plane P which is preferably coincident with the mid-circumferential plane of the mold cavity and of the carcass. When closed, the assembly has plane parallel top and bottom surfaces 61,63 which are perpendicular to the centerline axis of the assembly. The mold assembly includes also a third mold member: namely, the previously described centering means which is the circumferentially continuous metal rigid ring 20. Each mold half has a curvate surface which molds the associated sidewall of the carcass from the shoulder region Ca,Cb inward radially of the carcass. The radially inward surface of each mold half from the respective shoulder region toward the parting plane is conical and conjugate to the radially outward surface of the previously described ring.

The lower mold half member 29 has a circumferential groove 71 sunk in the radially inward surface 53 parallel to and spaced axially below the plane P a distance equal to the distance from the plane 35 of the grooves 54 in the ring 20 such that the grooves 54,71 come in directly opposed relation and accommodate the keys 72, which with the two grooves 54,71 provide the previously mentioned locking means. It will be apparent from FIG. 1 that, with the keys 72 in position, the upper mold half member 27 can be removed without risk of lifting also the ring 20 and the carcass C from the lower mold half member 29.

To provide access for the keys 72, the lower mold half (FIG. 5) has a pair of relatively short arcuate slots 74 spaced 180 degrees apart and opening between the parting face 76 of the mold member 29 and the lower wall 78 of the groove 71. The outer wall 81 of each slot is spaced radially outward of the bottom 83 of the groove to accommodate a lug 85 on the key 72. The slot is dimensioned so that the key can be placed or removed while the ring 20 is in position in the lower mold half member 29. Locking is effected by sliding the key in the direction of the arrow 87, causing the key to move radially inward to engage the groove 54 of the ring, the position then being as shown in FIG. 1. To release the ring, each key is slid opposite to the direction of the arrow 87 and moved radially outward into the slot 74 and removed, allowing the ring 20 to be lifted from the lower mold half member 29.

The lower member 29 is provided also with a further pair of slots identical to and spaced arcuately from the slots just described and located oppositely at 180 degrees from each other. These latter slots accommodate the trunnions 45 of the centering ring 20 and provide space for the application and removal of the cable sling 47 to and from the trunnions.

The process of the invention is carried out by preparing for the tire a carcass C having a tread receiving or crown region symmetrical with respect to a mid-circumferential centerline of the carcass. The carcass is built and a mid-circumferential centerline 7 is marked thereon in any convenient manner not within the scope of the invention. The carcass is disposed coaxially and symmetrically around shaping means 10 for shaping the carcass to a toroidal condition. The shaping means is located apart from the curing mold means and prior to shaping the carcass the third member of the curing mold means, namely, the centering ring 20, is disposed coaxially about the carcass C and the shaping means symmetrically with respect to the mid-circumferential centerline 7 of the carcass. To facilitate the accurate location of the centering ring with respect to the carcass, the ring has a plurality of peepholes 40 extending radially between the inner 31 and outer surfaces 33 of the ring and arcuately spaced along the mid-circumferential centerline, i.e., the plane 35, of the ring. Each of the peepholes is provided with a removable screw-plug 42 which is removed during the centering of the ring on the carcass so as to expose the mid-circumferential centerline 7 of the carcass and permit visual alignment of the ring centerline and central plane, and the carcass centerline. When the alignment has been satisfactorily made, the carcass is expanded or expanded further to engage at least a significant part of the axial extent of the inner surface 31 of the ring to secure the ring and the carcass together as a transportable unit. The plugs 42 are then inserted to close the peepholes and to provide a part of the inner surface conforming to the pattern thereon. Next, lifting means in the form of the cable slings 47 are engaged about the trunnions 45 to lift the ring with the carcass therein and to transport them together to the mold. The ring and carcass are then lowered to locate the ring concentrically of the lower mold half member 29 guided by the cooperating conical surfaces 33,53 and to locate the ring and the carcass symmetrically with respect to the plane P. As will be seen, the carcass, being at least partially engaged by the inner surface of the ring and supported thereby is prevented from sagging or drooping into the lower half mold member 29 to a non-symmetric relation with the plane P. Two keys 72 are then placed in locking relation in the grooves 71,54. The slings 47 are removed from the trunnions 45 and the upper half mold member 27 is then lowered to close the mold assembly which is then placed in a conventional autoclave or pot heater where the carcass is cured in the same manner as is a conventional tire.

After a predetermined curing period in the pot heater, the mold is removed therefrom and opened by removing the half mold member 27. The now cured carcass is then lifted from the lower mold half member 29 and from the centering ring retained therein by the keys. The keys are then removed and the centering ring lifted from the mold member 29 and carried to the shaping means to repeat the cycle described.

Alternatively, the keys can be disengaged from the grooves and the now cured carcass and the centering ring are lifted from the mold half member 29.

When the carcass and ring are removed and permitted to cool, the carcass shrinks sufficiently to permit the centering ring to be disengaged from the grooves of the tread-receiving region and be lifted from the tire.

When the centering ring is provided as a plurality of arcuate segments, the bolts 58 from each of the links 56 can be removed and the several segments can be removed radially of the tire.

Upon being removed from the now cured carcass, the ring 20 is then carried back to the shaping means for use in a subsequent tire carcass in the manner described.

The advantages of the invention are obtained when used in making any very large tire which is subject to sagging, creep, or similar deformation after the tire or carcass is built but before the same is enclosed in a curing mold. Examples of such very large tires include bias-belted tires having aspect ratios of 65 percent or less, or any very large tire having a heavy integral tread the weight of which tends to create the sag and dissymmetry of the tire carcass with respect to the plane P of the mold assembly. As mentioned earlier herein, the invention is particularly useful in making a radial ply carcass which lacks the customary circumferentially restrictive breaker belt to which carcass, after curing, an endless tread and belt assembly is applied to form a complete tire. Very large tires will be understood to mean tires 18.00×24 and larger. Such very large tires, and carcasses for such tires, when uncured, tend to sag or droop with respect to the true mid-circumferential plane to an undesirable extent. When attempting to place such tire or carcass, particularly the radial carcass without a breaker belt in a mold heretofore, more of the tire crown portion has been found to settle or sag into the lower half of the mold, with the result that an undesirable lack of symmetry may develop in the curing of the tire in the mold. By employing the centering ring means of the present invention, the crown portion is controlled in its diameter and is accurately located in the mold.

While certain representative embodiments and details have been shown for the purpose of illustrating the invention, it will be apparent to those skilled in the art that various changes and modifications may be made therein without departing from the spirit or scope of the invention.

We claim:

1. A method of making a large tire including preparing for said tire a carcass having a tread receiving region symmetrical with respect to a mid-circumferential centerline of said carcass, shaping the uncured tire carcass to toroidal form and molding and curing said carcass in a curing mold means having two mold members and a third mold member removably disposable coaxially and symmetrically between said first two members; positioning said third member remotely from said curing mold means and coaxially of said carcass shaping means and symmetrically with respect to the mid-circumferential centerline of said carcass, shaping said carcass to engage said third member by a pressure within said carcass sufficient to maintain said third member and said carcass securely engaged to one another, transporting said third member and the carcass therein together to said molding and curing means, placing said third member with said carcass therein in coaxial registry with one of said two mold members and thereby locating the mid-circumferential centerline of said carcass in the mid-circumferential plane of said curing mold means, placing the other of said two mold members in mold closing relation with said one mold member, and thereafter completing the molding and curing of said carcass.

2. Method as claimed in claim 1, further comprising positioning said third member symmetrically with respect to said mid-circumferential line of said carcass by visually aligning the mid-circumferential line of said third member with the mid-circumferential centerline of said carcass by means of peepholes formed in said third member and closing said peepholes by plug means after said carcass and said third member are securely united.

3. Method as claimed in claim 1, further comprising subsequently to said molding and curing of the carcass, permitting said carcass to shrink sufficiently then removing said third member from engagement with said carcass.

* * * * *